Patented Feb. 13, 1951

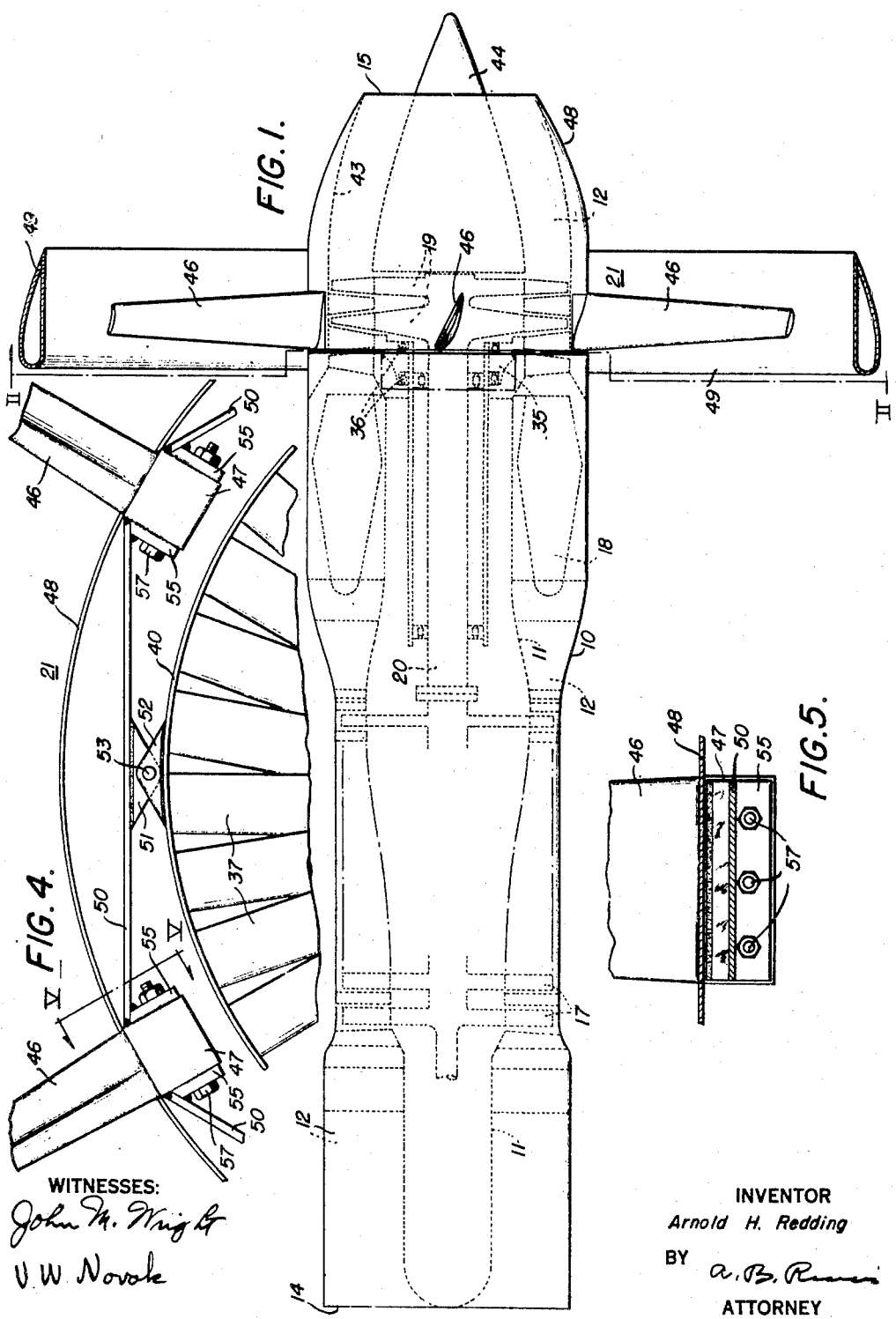

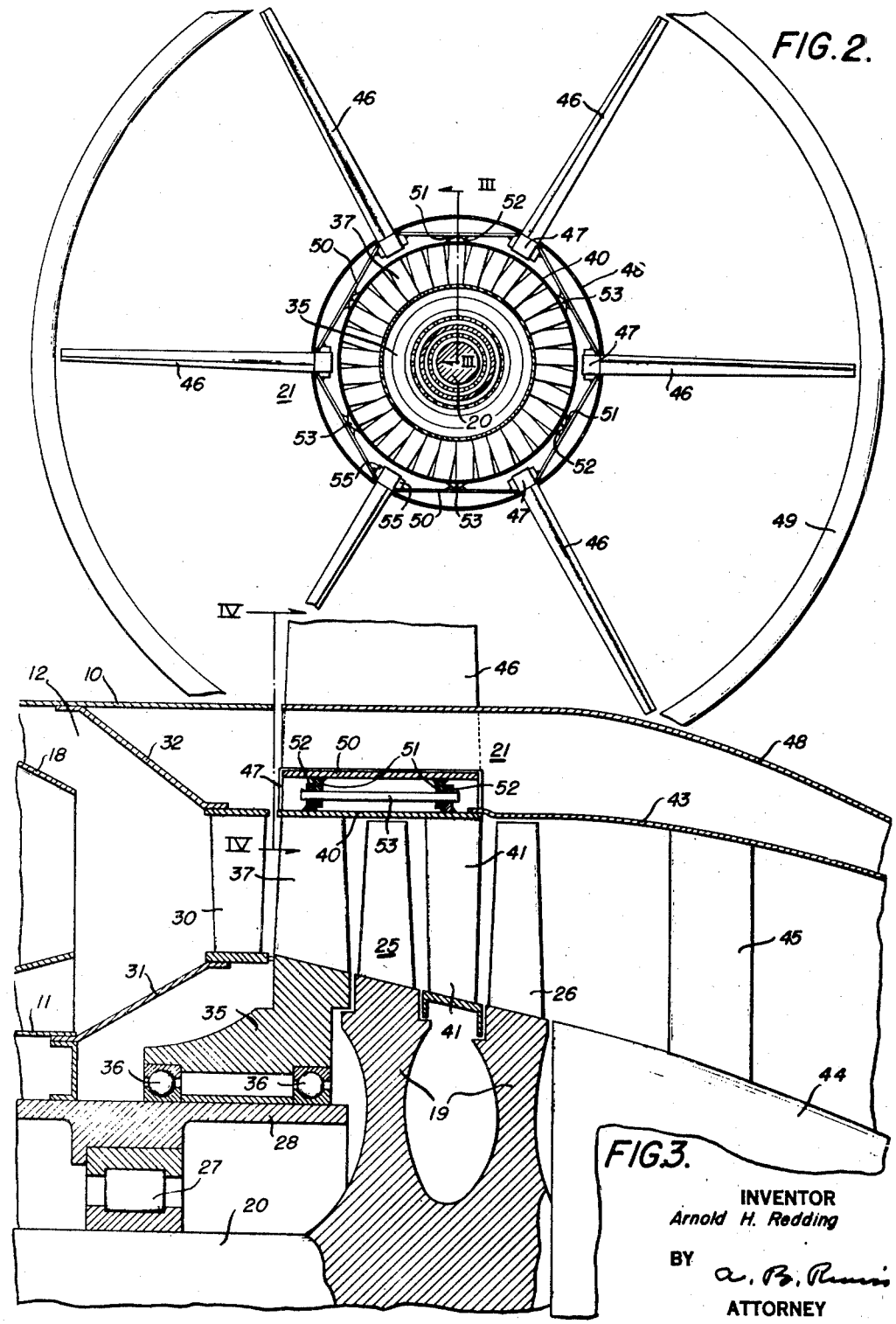

2,541,098

UNITED STATES PATENT OFFICE 2,541,098

GAS TURBINE PROPELLER APPARATUS

Arnold H. Redding, Swarthmore, Pa., assignor to Westinghouse Electric Corporation, East Pittsburgh, Pa., a corporation of Pennsylvania Application June 14, 1948, Serial No. 32,941

5 Claims. (Cl. 170—135.7)

This invention relates to gas turbine power plants for propelling aircraft, and more particularly to a gas turbine engine operative for driving a ducted propeller.

In applicant's copending application, Serial No. 523,715, filed February 24, 1944 now Patent No. 2,478,206 dated August 9, 1949 and assigned to the assignee of the present application, there is disclosed an aviation gas turbine power plant having coaxial low and high speed turbine rotors which are operated by motive fluid delivered under pressure from a combustion apparatus for separately driving a compressor and a ducted propeller. In that application, the propeller blades are mounted on the annular shroud surrounding the blading of one of the turbines, the entire rotor assembly being journaled independently of the companion turbine, which is operative in the opposite direction to drive the usual compressor of the power plant.

It is an object of the present invention to provide a gas turbine power plant having a construction generally similar to that disclosed in the aforementioned patent application, in which the propeller assembly is provided with auxiliary tension members for absorbing radial or centrifugal forces to which the propeller blades are subjected during operation, so that only torque and thrust forces can be imposed on the turbine blading and shroud.

Another object of the invention is the provision of a combination turbine and propeller rotor aggregate including a framework of flat tension members for securing the propeller blades against radial forces without transmitting such forces to the supporting turbine blading.

A further object of the invention is the provision of a unitary turbine and propeller rotor comprising turbine blades mounted within an annular shroud, a plurality of propeller blades adapted to be carried on the shroud and having a relatively large tip diameter, and propeller supporting means including means for connecting the root portions of the propeller blades together independently of the means fastening the propeller blades to the turbine shroud, whereby the centrifugal loading of the propeller blades is absorbed and only thrust and torque forces are transmitted through to the turbine blading.

These and other objects are effected by the invention as will be apparent from the following description and claims taken in connection with the accompanying drawing, forming a part of this application, in which:

Fig. 1 is a diagrammatic elevational view of an aviation gas turbine power plant having a ducted propeller assembly constructed in accordance with a preferred form of the invention;

Fig. 2 is a fragmentary sectional view taken substantially along the line II—II of Fig. 1;

Fig. 3 is an enlarged-detail fragmentary view taken substantially along the line III—III of Fig. 2;

Fig. 4 is a fragmentary sectional view taken substantially along the line IV—IV of Fig. 3; and Fig. 5 is a sectional view taken substantially along the line V—V of Fig. 4.

Referring to Fig. 1 of the drawing, the gas turbine power plant therein illustrated in diagrammatic form is one of the directly-connected propeller type with which my invention may advantageously be associated. As shown in this figure, the power plant comprises a streamlined outer casing structure 10 in which may be mounted a sectional inner casing structure 11 providing an annular flow passage 12, which constitutes a through communication extending from a forwardly directed air intake opening 14 to a rearwardly directed discharge or jet nozzle 15. The outer casing structure 10 is adapted to be mounted in or on the fuselage or wing of an aircraft in any suitable manner, and houses the operating elements of the engine which are arranged in line so as to present minimum frontal area, thus minimizing drag during operation of the aircraft. The operating elements of the gas turbine power plant include an axial flow compressor 17, an annular fuel combustion apparatus 18, a turbine 19 operatively connected to the rotor of the compressor 17 through the medium of a shaft 20, and an auxiliary turbine and propeller aggregate indicated generally by the reference character 21, which is adapted to be driven independently of the turbine 19 as hereinafter explained.

In accordance with the well-known principle of operation of a gas turbine power plant, air entering the inlet opening 14 is compressed by the compressor 17 and delivered to the combustion apparatus 18 to support combustion of fuel therein, and the resultant heated motive fluid flowing from the combustion apparatus is then expanded through the turbine 19 for driving the compressor 17, and past the adjacent turbine blading for driving the turbine and propeller aggregate 21, finally issuing through the nozzle 15 in the form of a jet establishing a propulsive thrust.

Referring now to Fig. 3 of the drawing, it will be seen that the compressor driving turbine 19 carries two stages of turbine blades 25 and 26, and is carried on the end of the shaft 20 rearwardly of a bearing 27, which is mounted within a cylindrical member 28 suitably supported by the inner casing structure 11. A stationary turbine diaphragm or nozzle structure 30 is preferably mounted on the annular frusto-conical members 31 and 32, respectively welded or otherwise secured to the inner and outer casing structures 11 and 10, the diaphragm 30 being disposed in advance of the turbine blading 25.

According to the invention, the auxiliary turbine and propeller aggregate 21 comprises an annular rotor member or hub 35 which is journaled on bearings 36 supported on the outer surface of the cylindrical member 28, and a plurality of radially disposed turbine blades 37 which are interposed between the stationary blades of the diaphragm 30 and the first stage of turbine blades 25. It will be understood that any desired blade root construction may be employed for securing the turbine blades 37 to the hub 35.

Secured to the peripheral or outer portions of the turbine blades 37 is an annular shroud 40, which extends rearwardly and carries a second stage of blades 41 that are interposed between the oppositely rotative blades 25 and 26 of the turbine 19. Also extending rearwardly from the annular shroud 40 is the tapered inner wall section 43 of a tailpiece or nozzle assembly of the power plant, other elements of this assembly including a centrally disposed core member 44 supported within the inner wall 43 through the medium of radially disposed struts 45.

The annular shroud 40 is also adapted to support a plurality of radially arranged propeller blades 46, each of which has a base or root portion 47 adapted to extend, through a suitable aperture formed in the outer wall 48, into close proximity to the shroud 40. The outer ends of the propeller blades 46 terminate closely adjacent an annular duct or shroud 49, (see Fig. 2), which may be suitably supported in concentric relation to the casing structure 10 by suitable struts (not shown).

As best shown in Fig. 4 of the drawings, the base portions 47 of the respective propeller blades 46 are adapted to be tied together by means of a plurality of flat tension members or tie elements 50, each of which has a pair of centrally disposed lugs 51 adapted to be secured to a complementary pair of lugs 52 carried on the outer surface of the shroud 40. Suitable pins, such as the pin 53, may be provided for thus securing together the associated lugs 51 and 52. Each tension member 50 further comprises oppositely disposed, angularly arranged flanges 55, which are adapted to abut the base portions 47 of the respective propeller blades 46. When each propeller blade 46 is thus assembled between the abutting flanges 55 of the adjacent tension members 50, one or more bolts 57 are inserted through registering openings in the members for securing them together as shown in Fig. 5.

As shown in Fig. 2, the assembled propeller blades 46 and tension members 50 are thus adapted to constitute a substantially polygonal framework surrounding the shroud 40 and turbine blading 37, the shroud being connected to the respective tension members 50 intermediate the ends thereof by the pins 53, so that during rotation of the turbine and propeller aggregate 21, only torque and thrust forces of the propeller blades 46 can be transmitted to the shroud, while the much greater radial or centrifugal forces are absorbed by the tension members 50.

It will be understood that the application to the turbine and propeller aggregate 21 of the improved propeller blade supporting means, including the tension members 50, will not necessitate any substantial alteration in the dimensions or construction of the turbine rotor assembly employed with such apparatus, since each of the tension members is adapted to be contained entirely within the space defined between the turbine shroud 40 and the outer housing wall 48 of the tail section of the power plant.

While the invention has been shown in but one form, it will be obvious to those skilled in the art that it is not so limited, but is susceptible of various changes and modifications without departing from the spirit thereof.

What is claimed is:

1. Aircraft propulsion apparatus comprising a casing structure, a turbine rotor mounted in said casing structure, a plurality of radially extending propeller blades adapted to be carried on the peripheral portion of said turbine rotor, a plurality of tension members interposed between the base portions of said blades, each of said tension members being substantially tangentially aligned with relation to said turbine rotor and interlocked therewith, and means for securing the base portion of each blade between the abutting ends of the adjacent tension members, each base portion being clear of said turbine rotor.

2. Aircraft propulsion apparatus comprising a casing structure, a turbine rotor mounted in said casing structure, a plurality of radially extending propeller blades adapted to be carried on the peripheral portion of said turbine rotor, a plurality of tension members interposed between the base portions of said blades, each of said tension members being secured intermediate its ends to the peripheral portion of said turbine rotor, and means for securing the base portion of each of said blades between the abutting ends of the tension members adjacent thereto for supporting each base portion clear of said peripheral portion of the rotor, whereby said tension members are adapted to absorb radial forces on said blades while said turbine rotor is subject only to thrust and torque forces.

3. Aircraft propulsion apparatus comprising a casing structure, a turbine rotor mounted in said casing structure, a plurality of radially extending propeller blades adapted to be carried on the peripheral portion of said turbine rotor, a plurality of tension members interposed between the base portions of said blades, each of said tension members having flanged ends and a portion intermediate thereof connected in tangential relation to said turbine rotor, and bolts adapted to secure the respective blades between abutting pairs of said flanged ends of said tension members with said blades clear of said rotor, whereby said tension members are adapted to absorb radial forces on said blades while said turbine rotor is subject only to thrust and torque forces.

4. A turbine driven propeller assembly comprising a turbine rotor including an annular shroud, a plurality of radially extending propeller blades adapted to be carried on said shroud, a plurality of straight tension members interposed in end-to-end relationship between the base portions of said propeller blades and secured intermediate their ends to said shroud, and means for securing each of said base portions between the abutting ends of adjacent tension members thus supporting said base portions clear of said shroud, for transmitting to said tension members the centrifugal forces on said blades while subjecting said turbine shroud to torque and thrust forces.

5. A turbine driven propeller assembly comprising a turbine rotor having an annular shroud, a plurality of propeller blades having root portions, a plurality of flat tension members having end portions adapted to be connected in abutting relation to the respective root portions of said blades for constituting a polygonal framework encompassing said annular shroud with said blade root portions spaced outwardly thereof, a cylindrical housing having openings for said blades and adapted to be supported therewith outwardly of said framework of tension members, and means for securing each of said tension members intermediate its ends to said shroud, whereby radial forces on said propeller blades are absorbed by said tension members with transmission of only torque and thrust forces to said turbine rotor.

ARNOLD H. REDDING.

REFERENCES CITED

The following references are of record in the file of this patent:

UNITED STATES PATENTS

| Number | Name | Date |
|---|---|---|
| 4,181 | Ericsson | Sept. 9, 1845 |
| 1,017,564 | Lake | Feb. 13, 1912 |
| 1,116,257 | Flatau | Nov. 3, 1914 |
| 2,232,670 | Barrett | Feb. 18, 1941 |
| 2,286,908 | Goddard | June 16, 1942 |
| 2,404,767 | Heppner | July 23, 1946 |
| 2,478,206 | Redding | Aug. 9, 1949 |

FOREIGN PATENTS

| Number | Country | Date |
|---|---|---|
| 326,932 | Italy | June 27, 1935 |